(12) United States Patent
Chang et al.

(10) Patent No.: US 9,645,428 B2
(45) Date of Patent: May 9, 2017

(54) DISPLAY PANEL WITH PROTECTIVE ADHESIVE PORTION AND MANUFACTURING METHOD THEREOF

(71) Applicant: AU Optronics Corporation, Hsin-Chu (TW)

(72) Inventors: Chih-Sheng Chang, Hsin-Chu (TW); Jen-Kuei Lu, Hsin-Chu (TW); Sheng-Ming Huang, Hsin-Chu (TW); Hui-Ku Chang, Hsin-Chu (TW); Wei-Chi Wang, Hsin-Chu (TW); Sheng-Kai Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 240 days.

(21) Appl. No.: 14/564,465

(22) Filed: Dec. 9, 2014

(65) Prior Publication Data
US 2015/0177557 A1 Jun. 25, 2015

(30) Foreign Application Priority Data
Dec. 20, 2013 (TW) .............................. 102147575 A

(51) Int. Cl.
G02F 1/1333 (2006.01)
G02F 1/1341 (2006.01)
G02F 1/1339 (2006.01)

(52) U.S. Cl.
CPC ...... *G02F 1/133351* (2013.01); *G02F 1/1339* (2013.01)

(58) Field of Classification Search
CPC .............................. G02F 1/1339; G02F 1/1341
See application file for complete search history.

(56) References Cited

U.S. PATENT DOCUMENTS 8,806,898 B2 8/2014 Han et al.
2012/0044445 A1 2/2012 Monma et al.

FOREIGN PATENT DOCUMENTS

CN 1716056 A 1/2006
TW 200947282 11/2009
(Continued)

OTHER PUBLICATIONS

Office Action issued in corresponding Taiwan patent application on Sep. 17, 2015.
(Continued)

*Primary Examiner* — Joseph L Williams
(74) *Attorney, Agent, or Firm* — McClure, Qualey & Rodack, LLP

(57) ABSTRACT

A display panel is provided. The display panel includes a first substrate, a second substrate, a sealing frame set, and a third adhesion portion. The first substrate has an inner surface which includes a superposed area and an exposed area on a side of the superposed area. The second substrate is disposed and superposed on the superposed area; the substrates have a space therebetween. The sealing frame set is located between the substrates and disposed along and insides an edge of the superposed area to enclose the space. The sealing frame set includes first and second sealing frames, wherein the first sealing frame connects the substrates and surrounds the superposed area, the second sealing frame surrounds an outer side of the first sealing frame. A third adhesion portion is located between the first and the second substrates, and between the second sealing frame and the exposed area.

18 Claims, 14 Drawing Sheets

(56) References Cited

FOREIGN PATENT DOCUMENTS

| | | |
|---|---|---|
| TW | 201033681 | 9/2010 |
| TW | 201132603 | 10/2011 |

OTHER PUBLICATIONS

CN Office Action dated Mar. 23, 2016 in corresponding Chinese application (No. 201410120603.5).
English translation of abstract of TW 200947282 (published Nov. 16, 2009).

DISPLAY PANEL WITH PROTECTIVE ADHESIVE PORTION AND MANUFACTURING METHOD THEREOF

BACKGROUND OF THE DISCLOSURE

1. Field of the Disclosure

The present disclosure generally relates to a display panel and a manufacturing method thereof. Particularly, the present disclosure relates to a thin type display panel and a manufacturing method thereof.

2. Background

The flat panel display device is extensively used in appliances having display function; in other words, facilities including display devices, computers, communication devices and home appliances are equipped with flat panel display device. There are a variety of display panels used in the flat panel display device such as the liquid crystal display panel and plasma display panel. Furthermore, in addition to the general flat structure, the display panels nowadays are lighter and thinner and further have curved or flexible characters. For example, a thin display panel can be processed to a curved or flexible display panel.

FIG. 1A and FIG. 1B show a conventional display panel 60 and a manufacturing method thereof. As shown in FIG. 1A, the conventional display panel 60 includes a first substrate 710 and a second substrate 720; the first substrate 710 and the second substrate 720 have a space therebetween and are superposed on each other, wherein the first substrate 710 has a bonding area 715 which protrudes out of the second substrate 720 and is not covered by the same. FIG. 1B demonstrates the manufacturing method of the conventional display panel 60. The first parent substrate 710' includes a plurality of first substrates 710, wherein each first substrate 710 includes a TFT array; a second parent substrate 720' includes a plurality of second substrates 720, wherein the second substrate 720 has a color filter. Sealant is disposed along an edge of the first substrate 710 and/or along an edge of the second substrate 720 and then the first parent substrate 710' and the second parent substrate 720' are assembled. The assembled first parent substrate 710' and the second parent substrate 720' are then processed with a first cutting step so as to form a plurality of display panel prototypes 60'; each the display panel prototype 60' includes one first substrate 710 and one second substrate 720. Afterwards each the display panel prototype 60' is processed with a thinning step to reduce the thickness of the first substrate 710 and the thickness of the second substrate 720. When performing the thinning process, on four sides of the display panel prototype 60' and the space between the first substrate 710 and the second substrate 720, a protective adhesive 800 is applied thereto in order to protect interior of the substrates. The thinned display panel prototype 60' can be processed with a second cutting step in accordance with cutting lines Cu' and Cu" shown in the figure so as to remove the edge with the protective adhesive 800 and a portion of the second substrate 720 to from a display panel 60 with the first substrate 710 protruding out of the second substrate 720 and an exposed bonding area 715. However, since the thinned substrates have insufficient rigidity, it may result easily in cracks in the substrates during the second cutting step and lower the production yield. The manufacturing method therefore has to be improved in some ways so as to increase the yield.

SUMMARY

It is an object of the present invention to provide a display device which is resistant to damage when cutting the same.

It is another object of the present invention to provide a manufacturing method of a display panel which improves the cutting efficiency of the display panel.

It is another object of the present invention to provide a manufacturing method of a display panel which has simplified steps.

The display panel of the present invention includes a first substrate, a second substrate, a sealing frame set, and a third adhesion portion. The first substrate has an inner surface which includes a superposed area and an exposed area on at least one side of the superposed area. The second substrate is disposed and superposed on the superposed area; the second substrate and the first substrate have a space therebetween. The sealing frame set is located between the first substrate and the second substrate and is disposed along and inside an edge of the superposed area to enclose the space. The sealing frame set includes a first sealing frame and a second sealing frame, wherein the first sealing frame connects the first substrate and the second substrate and surrounds the superposed area, the second sealing frame surrounds an outer side of the first sealing frame. A third adhesion portion is located between the first substrate and the second substrate, and between the second sealing frame and the exposed area.

Alternatively, the display panel of the present invention includes a first substrate, a second substrate, a sealing frame set and an adhesion portion. The first substrate has an inner surface which includes a superposed area and an exposed area on at least one side of the superposed area. The second substrate is disposed and superposed on the superposed area; the second substrate and the first substrate have a space therebetween. The sealing frame set is located between the first substrate and the second substrate and includes a first sealing frame connecting the first substrate and the second substrate as well as being disposed along and insides an edge of the superposed area and surrounding the superposed area to enclose the space. The adhesive portion is located between the first substrate and the second substrate, and located between the first sealing frame and the exposed area.

The manufacturing method of the display panel of the present invention includes steps of (a) disposing a sealing frame set along an edge of a superposed area of a first substrate, wherein the sealing frame includes a first sealing frame; (b) superposing a second substrate onto the first substrate and the sealing frame set adhering to the first substrate and the second substrate; (c) cutting the second substrate to expose an exposed area of the first substrate at an outer side of the superposed area; (d) disposing a third adhesion layer on the exposed area; (e) thinning the first substrate and the second substrate by a double-side etching; and (f) removing the third adhesion layer. In addition, the step (a) further includes disposing a second sealing frame surrounding the first sealing frame.

DETAILED DESCRIPTION

Figure 1A:
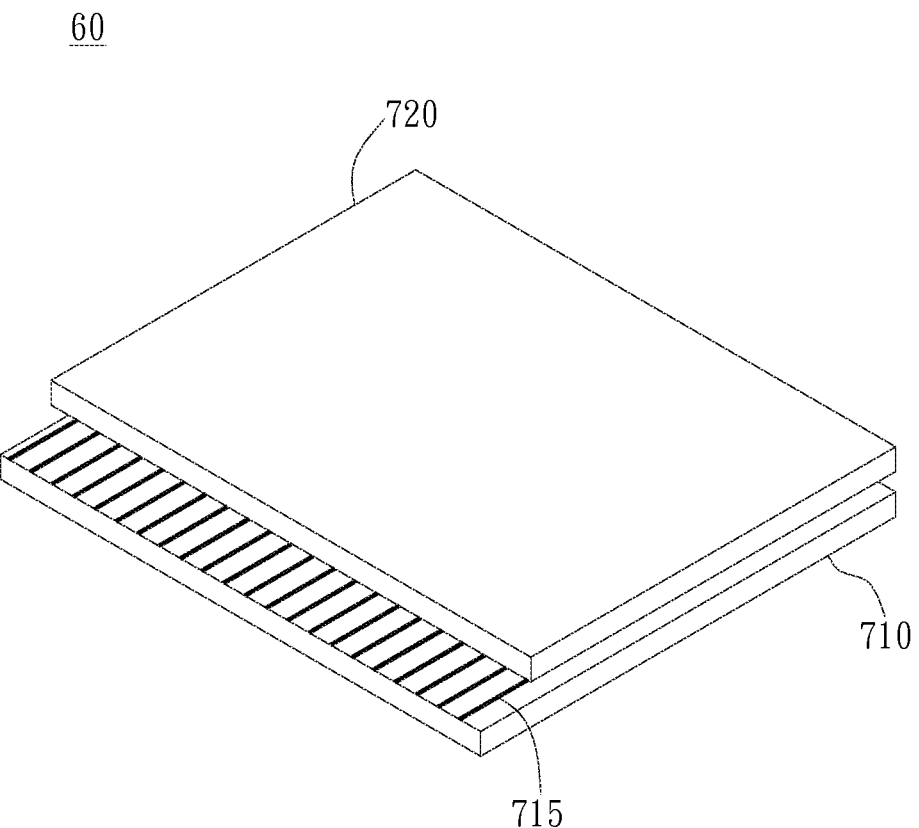
FIG. 1A shows a conventional display panel.
Figure 1B:
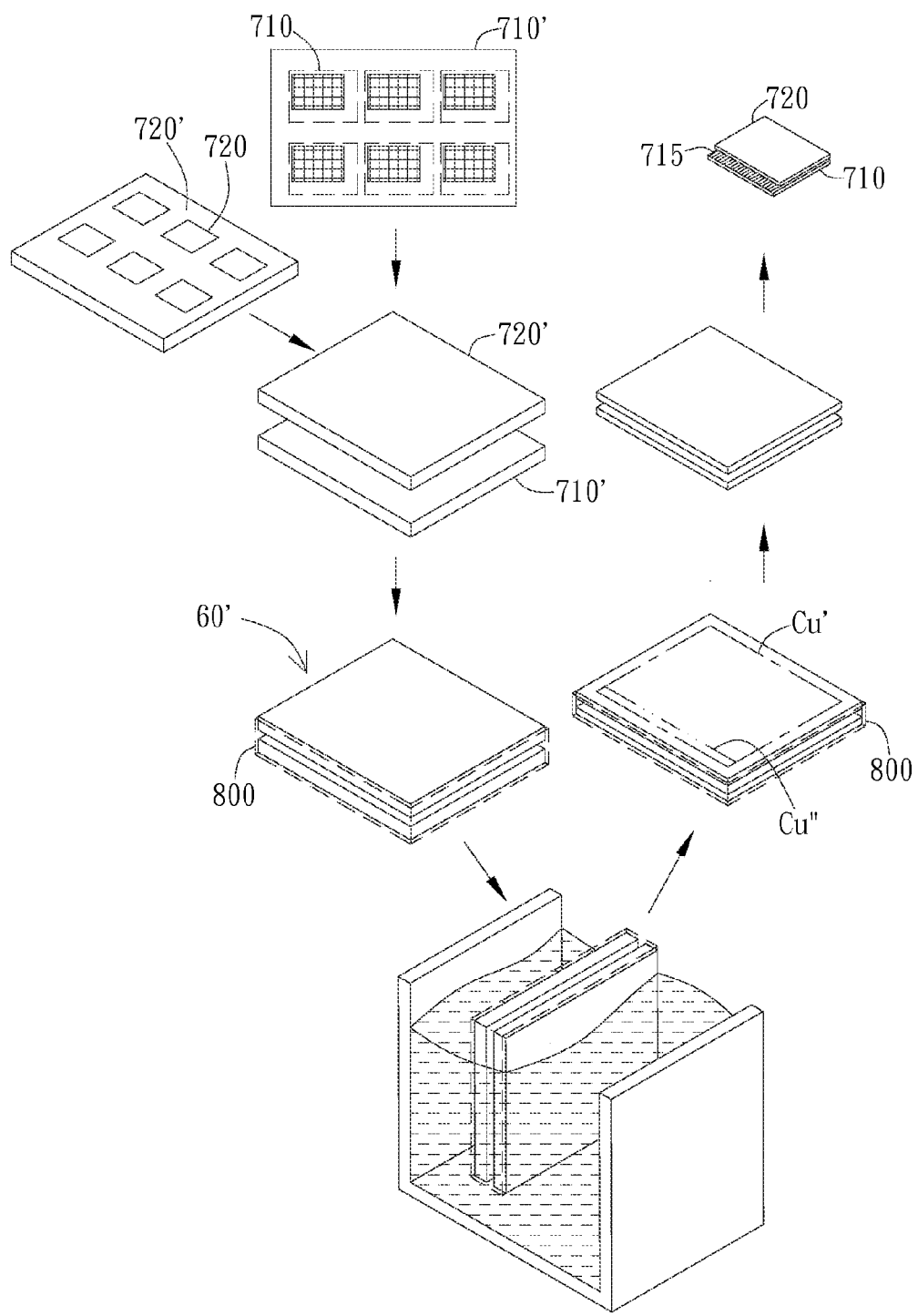
FIG. 1B shows a manufacturing process of a conventional display panel.

The display panel of the present invention may be the panel of flat display devices, the panel to be processed to become a curved display panel, or a flexible panel. As the embodiment shown in FIG. 2A-FIG. 2C, the display panel 10 includes a first substrate 100, a second substrate 200 and a sealing frame set 300, wherein the first substrate 100 and the second substrate 200 are light penetrable; materials thereof are mainly glass or plastic, for example. Furthermore, the first substrate 100 and the second substrate 200 have a space therebetween and are at least partially superposed on each other, wherein the sealing frame set (or namely sealant set) 300 is located between the first substrate 100 and the second substrate 200 and adheres to the first substrate 100 and the second substrate 200. Take the liquid crystal display panel for an example; on the first substrate 100 there may be TFT array disposed or formed; on the second substrate 200 there may be color filter disposed or formed. On either the first substrate 100 or the second substrate 200 liquid crystals are infused; later, the first substrate 100 and the second substrate 200 are disposed face to face and at least partially superposed with a space 250 existing therebetween. The sealing frame set 300 adheres to the first substrate 100 and the second substrate 200 and for example, confines the liquid crystals to a predetermined area on the substrate(s) such as a display area. In addition, the first substrate and/or the second substrate can be processed with a thinning process such as an etching step, becoming thinner in comparison to the original substrates (or namely thickness of the substrate is not etched), i.e. the parent substrate, wherein the thickness is, for example, less than 5 mm after the thinning process. In the embodiment of the present invention, the first substrate and/or the second substrate after the thinning process may have a thickness of such as about 0.1 mm. Furthermore, the thinning process may be performed before or after superposing and assembling the first substrate and the second substrate to form the display panel 10.

Specifically, the first substrate 100 has an inner surface 150 which includes a superposed area 152 and an exposed area 154 on at least one side of the superposed area 152. As the embodiment shown in FIG. 2A-FIG. 2C, the exposed area 154 is on two adjacent sides of the superposed area 152 and is L-shaped. Alternatively, as shown in FIG. 3, the exposed area 154 may be on one side of the superposed area 152. In addition, in the preferred embodiment of the present invention, the exposed area 154 has at least a portion as a bonding area of the display panel 10 and is allowed to be connected with a circuit board of the display device.

The above-mentioned of the sealing frame set 300 is disposed along and inside an edge of the superposed area 152 and substantially surrounds (or namely encircles) the superposed area 152. In one embodiment of the present invention, the sealing frame set 300 includes a first sealing frame 310 and a second sealing frame 320, wherein the second sealing frame 320 surrounds an outer side of the first sealing frame 310. In addition, the sealing frame set 300 is preferably distributed in a manner that the first sealing frame (or namely first sealant) 310 and the second sealing frame (or namely second sealant) 320 of the sealing frame set 300 enclose the space 250 between the first substrate 100 and the second substrate 200, wherein the spaces 250 may further be maintained (or namely auxiliary maintained) by means of spacers disposed between the first substrate 100 and the second substrate 200. Alternatively, in one embodiment of the present invention, the sealing frame set 300 can be disposed between the first substrate 100 and the second substrate 200 to form the space 250 between the first substrate 100 and the second substrate 200, wherein the space 250 may be resulted from such as disposing the sealing frame set 300 with a proper height in a direction of superposing the substrates.

For example, the first sealing frame 310 of the display panel 10 may have epoxy resin as a base material. The first sealing frame 310 further includes photo initiator and/or thermal hardener and preferably contains spacers, wherein the thermal hardener can improve adhesion strength with regard to the first substrate 100 and the second substrate 200; the spacers may be such as ball spacers. In addition, compositions of the ball spacers usually contain silicon. On the other hand, the second sealing frame 320 may also have epoxy resin as a base material and preferably has weaker adhesion strength compared to that of the first sealing frame 310. In addition, the second sealing frame 320 may or may not contain spacers and preferably has lower silicon content compared to the first sealing frame 310. When the second sealing frame 320 contains spacers, the second sealing frame 320 more preferably contains ball spacers of no silicon-containing compound. In sum, the first sealing frame 310 therefore has greater adhesion strength with regard to the first substrate 100 and the second substrate 200; in comparison to the first sealing frame 310, the second sealing frame 320 has weaker adhesion strength as well as greater resistance to the etching agent (described later) and preferably contains the materials having low silicon-containing compound. In certain circumstances, the second sealing frame 320 surrounding the outer side of the first sealing frame 310 protects the first sealing frame 310 which contains the silicon-containing compound from erosion resulted from the etching agent (described later).

Figure 2A:
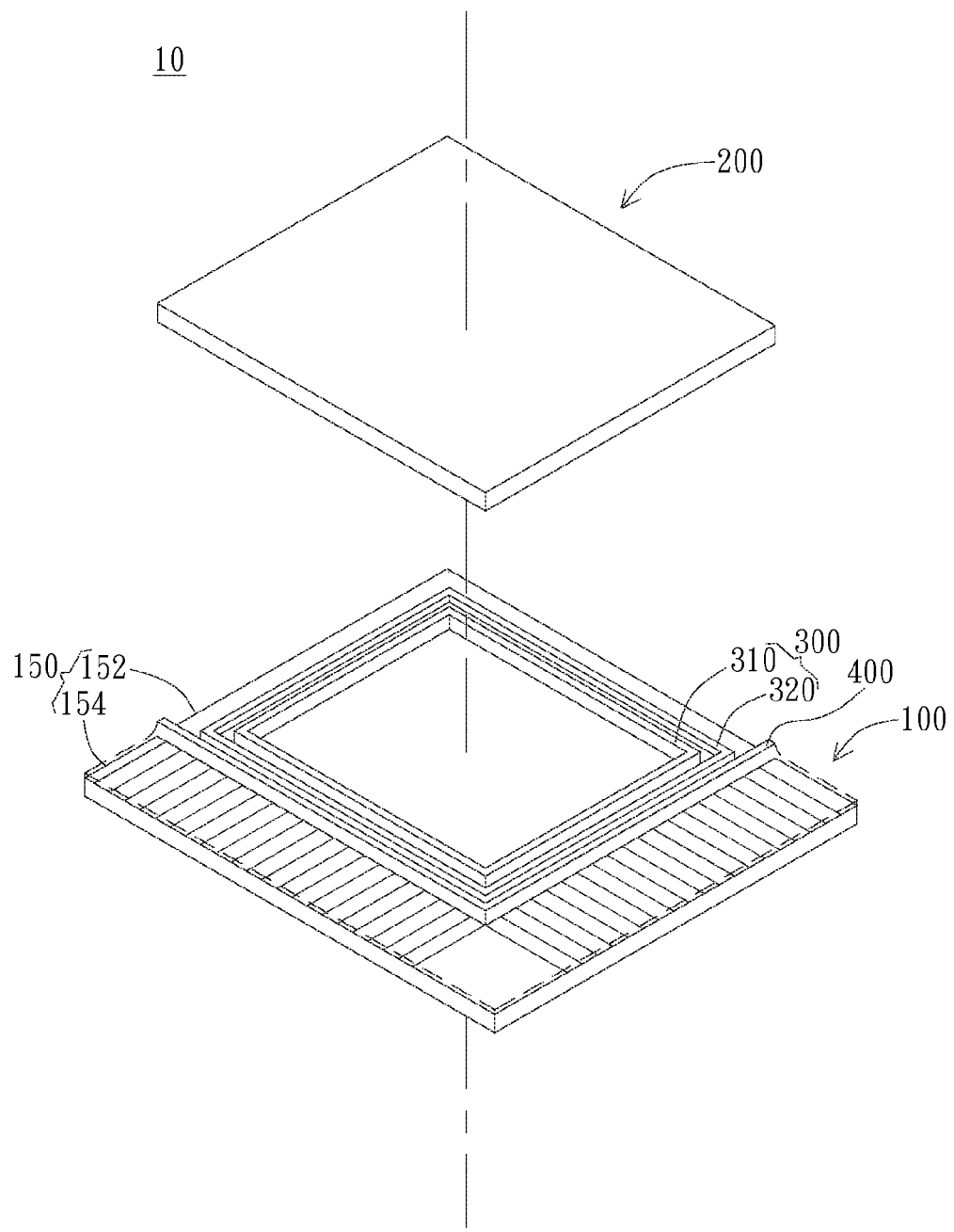
FIG. 2A is an exploded view of an embodiment of the display panel of the present invention.
Figure 2B:
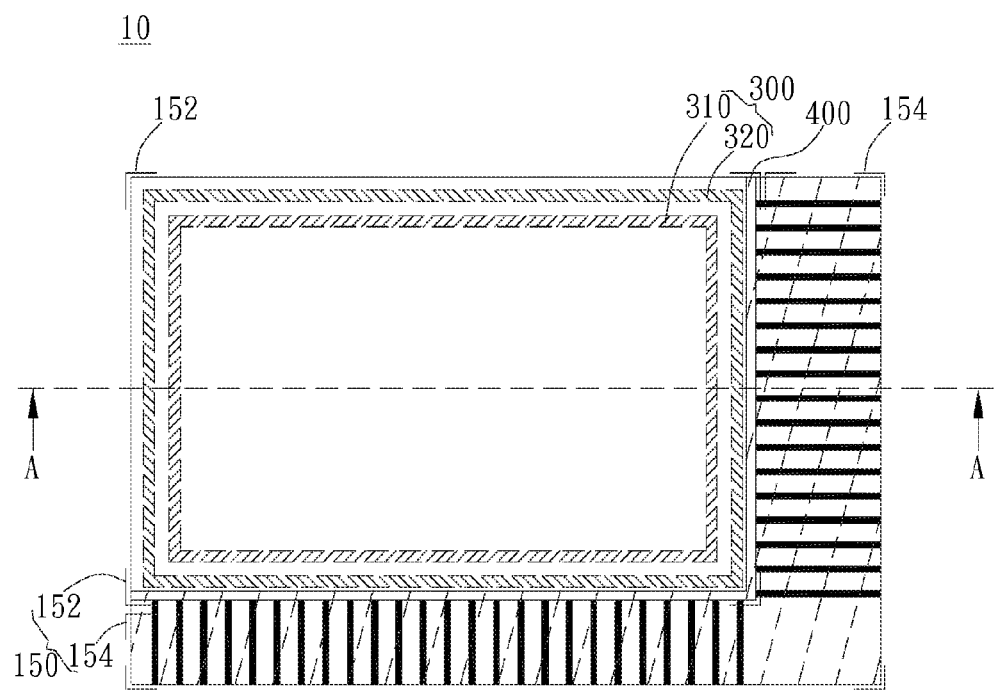
FIG. 2B is a top view of an embodiment of the display panel of the present invention.
Figure 2C:
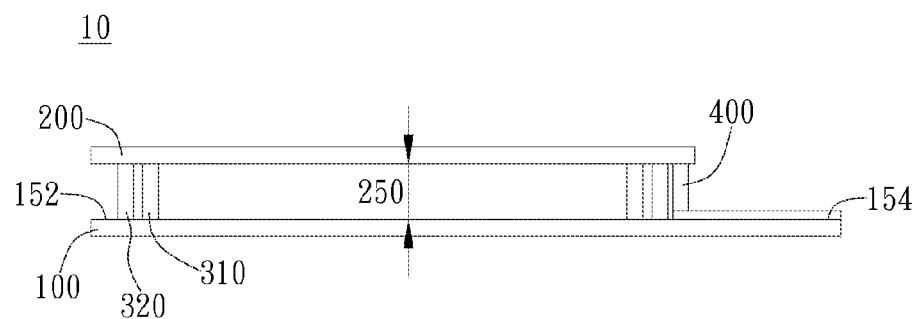
FIG. 2C is a cross-sectional view of the embodiment shown in FIG. 2B along the A-A line.
Figure 3:
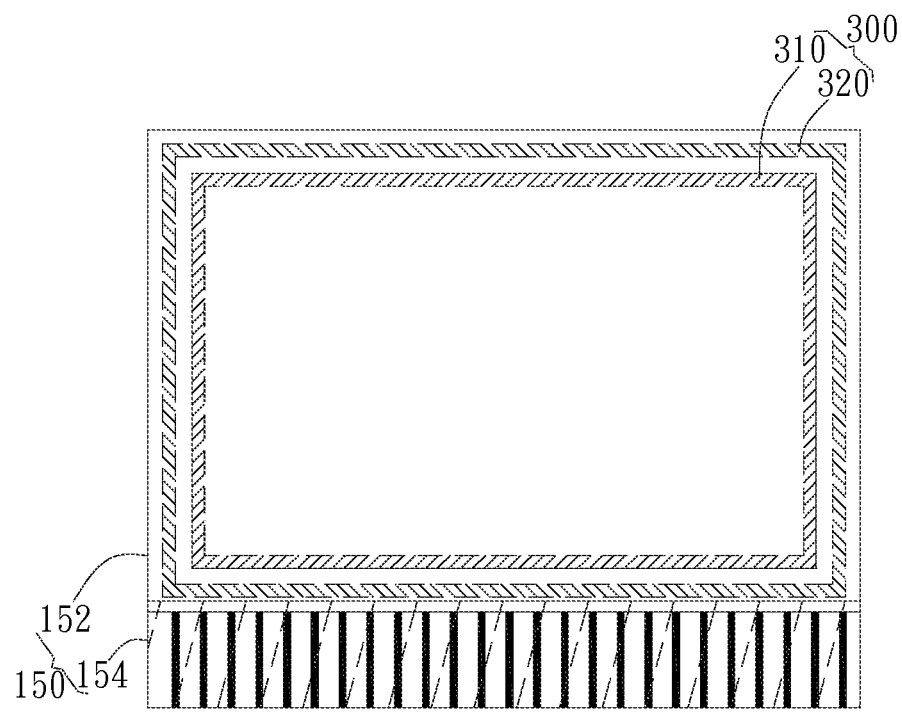
FIG. 3 is a top view of another embodiment of the display panel of the present invention.

As the embodiment shown in FIG. 2A-FIG. 2C, the display panel 10 of the present invention further includes a third adhesion portion 400. The third adhesion portion 400 is located between the first substrate 100 and the second substrate 200 and located between the second sealing frame 320 and the exposed area 154. However, the third adhesion portion 400 located between the second sealing frame 320 and the exposed area 154 may partially extend to the exposed area 154. On the other hand, compared to the first sealing frame 310 and the second sealing frame 320, strength of the third adhesion portion 400 adhering to the first substrate 100 or the second substrate 200 is smaller. Preferably, an adhesion component which forms the third adhesion portion 400 is removable, peelable/tearable when the adhesion component is attached to the first substrate 100 or the second substrate 200; comparatively, the first sealing frame 310 and the second sealing frame 320 are preferably fixed to the first substrate and the second substrate.

Figure 6A:
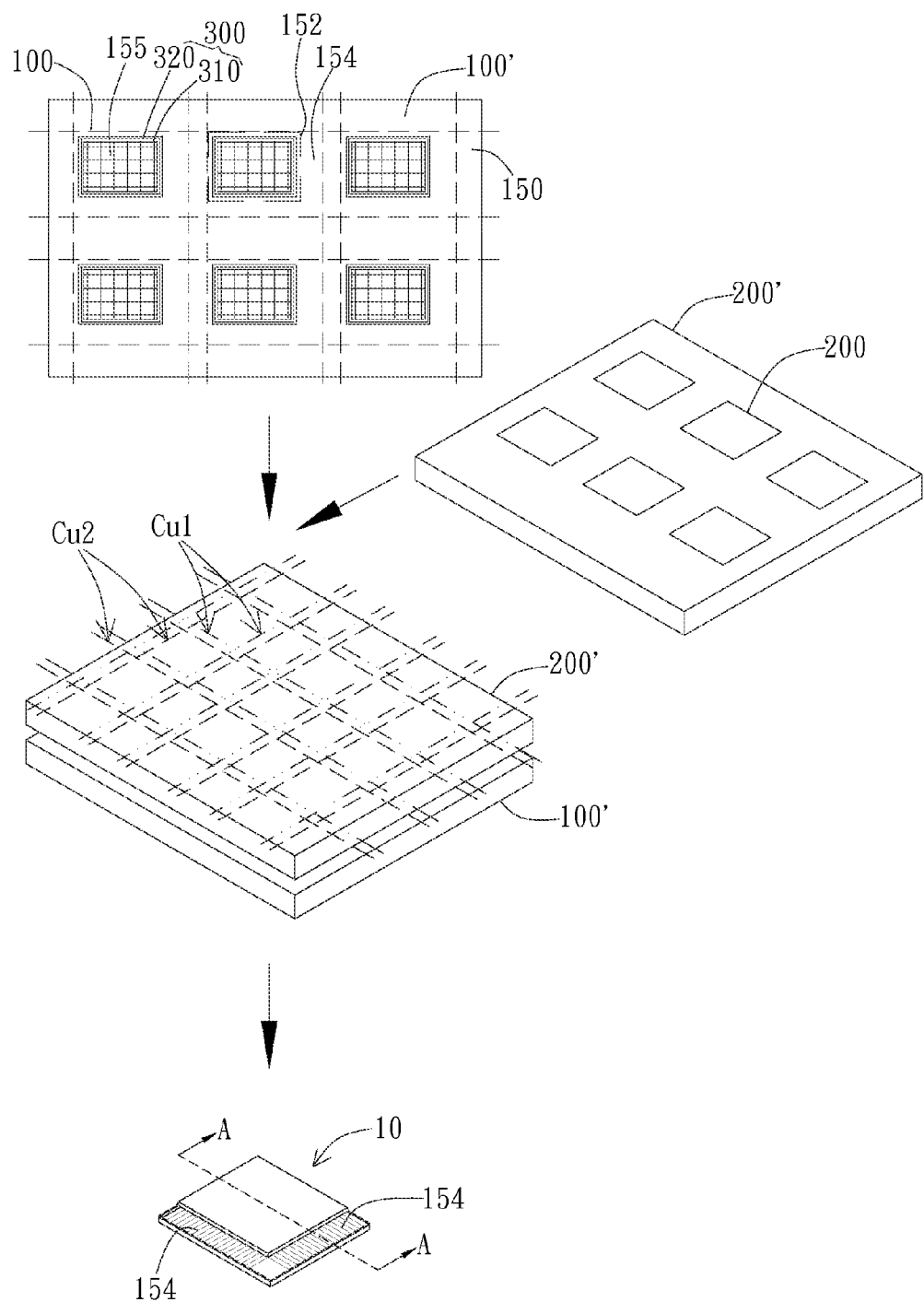
FIG. 6A-FIG. 6B show an embodiment of the manufacturing process of the display panel of the present invention.
Figure 6B:
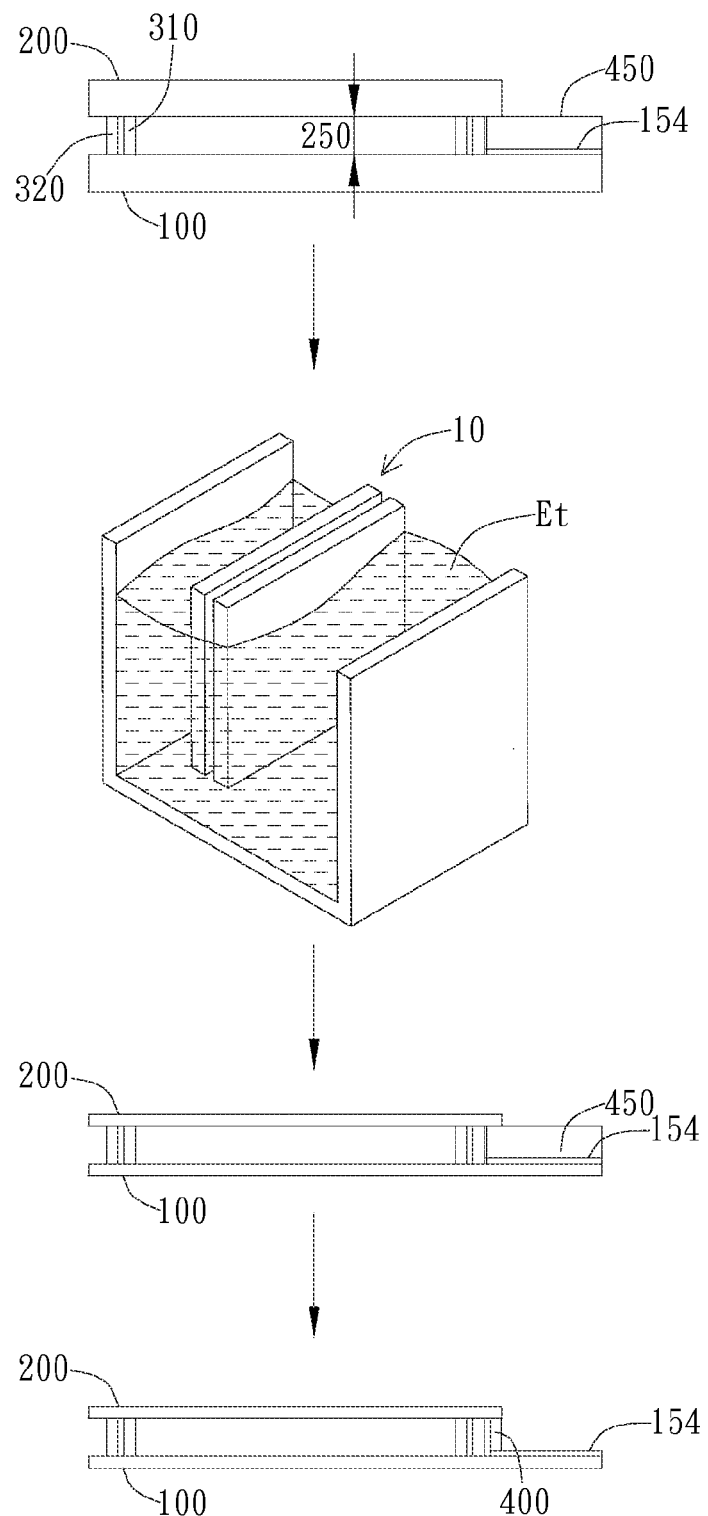

As the embodiment shown in FIG. 6B, the third adhesion layer 450 is attached to the exposed area 154 during the manufacturing process of the display panel 10, wherein the adhesion component of the third adhesion layer 450 preferably has very low silicon content; most of the third adhesion layer 450 is removed finally in the manufacturing process while a small portion remains between the second sealing frame 320 and the exposed area 154 and results in the third adhesion portion 400, as mentioned above. In addition, polymer residual from the adhesion component may remain on the exposed area 154 after the third adhesion layer 450 is removed. It is discovered by means of Energy Dispersive X-Ray (EDX) analysis that the polymer residual results in higher carbon content in an area where the third adhesion layer 450 is originally disposed.

Figure 4A:
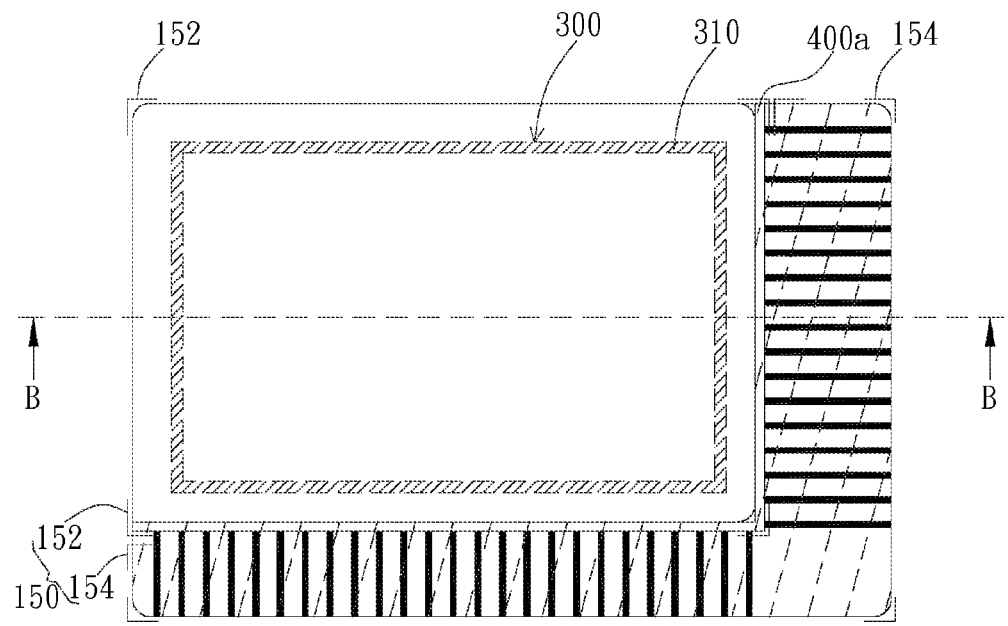
FIG. 4A is a top view of another embodiment of the display panel of the present invention.
Figure 4B:
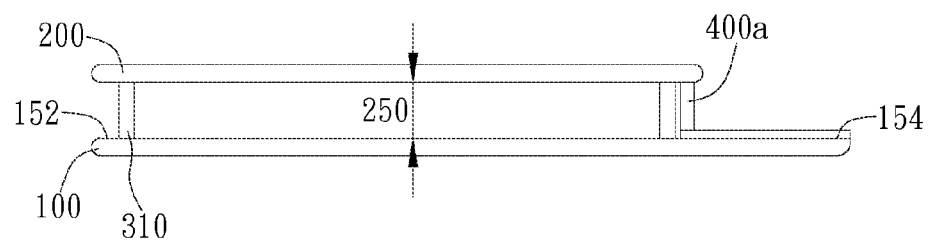
FIG. 4B is a cross-sectional view of the embodiment shown in FIG. 4A along the B-B line.
Figure 5A:
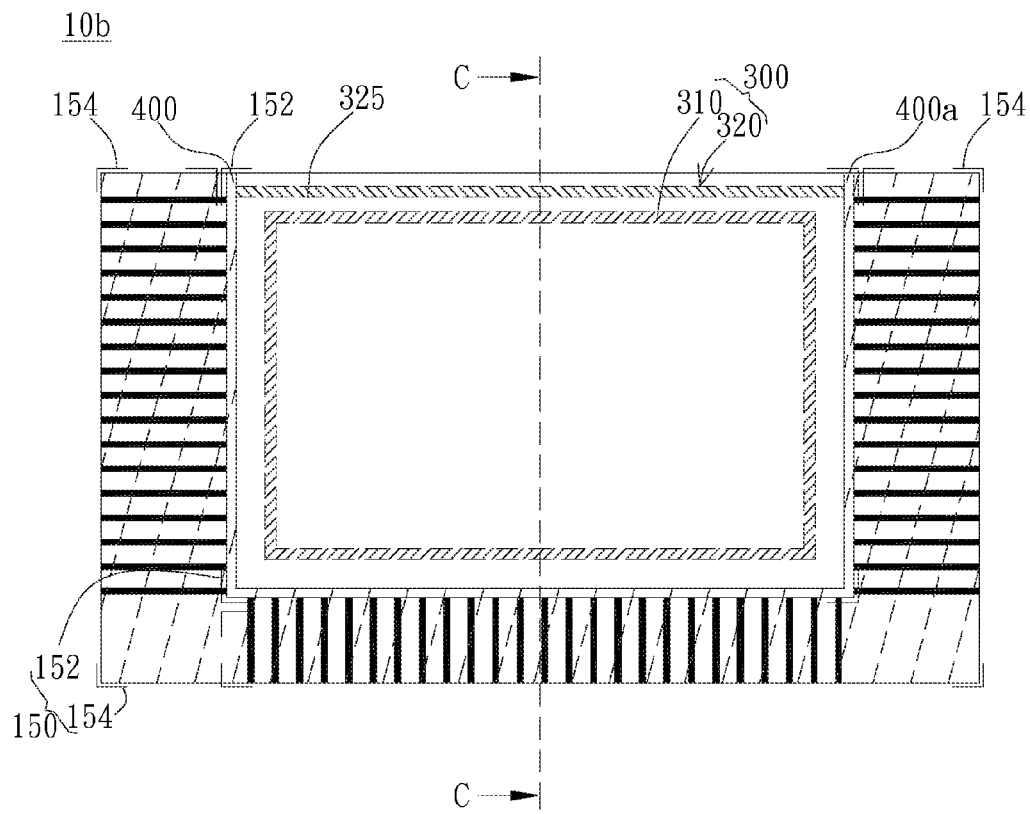
FIG. 5A is a top view of another embodiment of the display panel of the present invention.
Figure 5B:
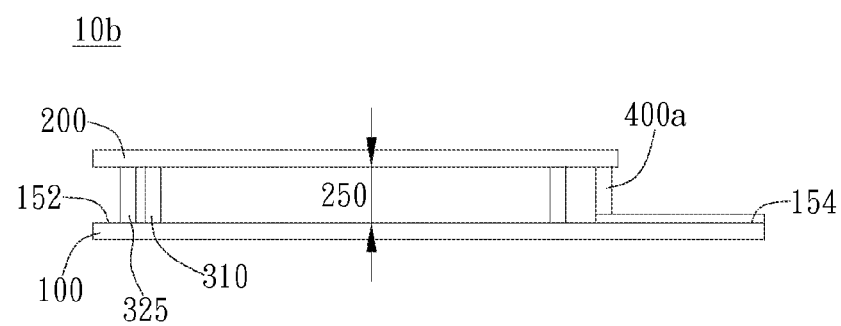
FIG. 5B is a cross-sectional view of the embodiment shown in FIG. 5A along the C-C line.

In another embodiment of the present invention as shown in FIG. 4A-FIG. 4B, the sealing frame set 300 of the display panel 10a includes the first sealing frame 310. The first sealing frame 310 is disposed along and inside the edge of the superposed area 152 and substantially surrounds the superposed area 152. The first sealing frame 310 connects the first substrate 100 and the second substrate 200 and is distributed to enclose the space 250 between the first substrate 100 and the second substrate 200. The materials/compositions of the first sealing frame 310 are as above mention and details are not repeated. The display panel 10a further has a protective adhesion portion 400a which is located between the first substrate 100 and the second substrate 200 and between the first sealing frame 310 and the exposed area 154. Preferably, an adhesion component which forms the protective adhesion portion 400a is removable, peelable/tearable when the adhesion component is attached to the first substrate 100 or the second substrate 200; comparatively, the first sealing frame 310 and the second sealing frame 320 are preferably fixed to the first and the second substrates. Properties of the protective adhesion portion 400a is similar to that of the third adhesion portion 400 mentioned above and details are not repeated In another embodiment of the present invention, as shown in FIG. 5A-FIG. 5B, the sealing frame set 300 of the display panel 10b includes the first sealing frame 310 and the second sealing frame 320, wherein the first sealing frame 310 is disposed along and inside the edge of the superposed area 152 and substantially surrounds the superposed area 152. The first sealing frame 310 connects the first substrate 100 and the second substrate 200 and is distributed to enclose the space 250 between the first substrate 100 and the second substrate 200. The second sealing frame 320 is located outsides the first sealing frame 310 and in the superposed area 152 one the side that is not adjacent to the exposed area 154. In addition, the second sealing frame 320 is not limited to a frame shape. As shown in FIG. 5A-FIG. 5B, the exposed area 154 is located on three sides of the superposed area 152, wherein the second sealing frame 320 has a second adhesion portion 325 located on the remaining side not adjacent to the exposed area 154. In other embodiments, the second adhesion portion may be disposed in other ways such as located on the two opposite sides of the superposed area 152. The display panel 10b further has the protective adhesion portion 400a. Please refer to the descriptions above for the properties and the location of the protective adhesion portion 400a.

Figure 7:
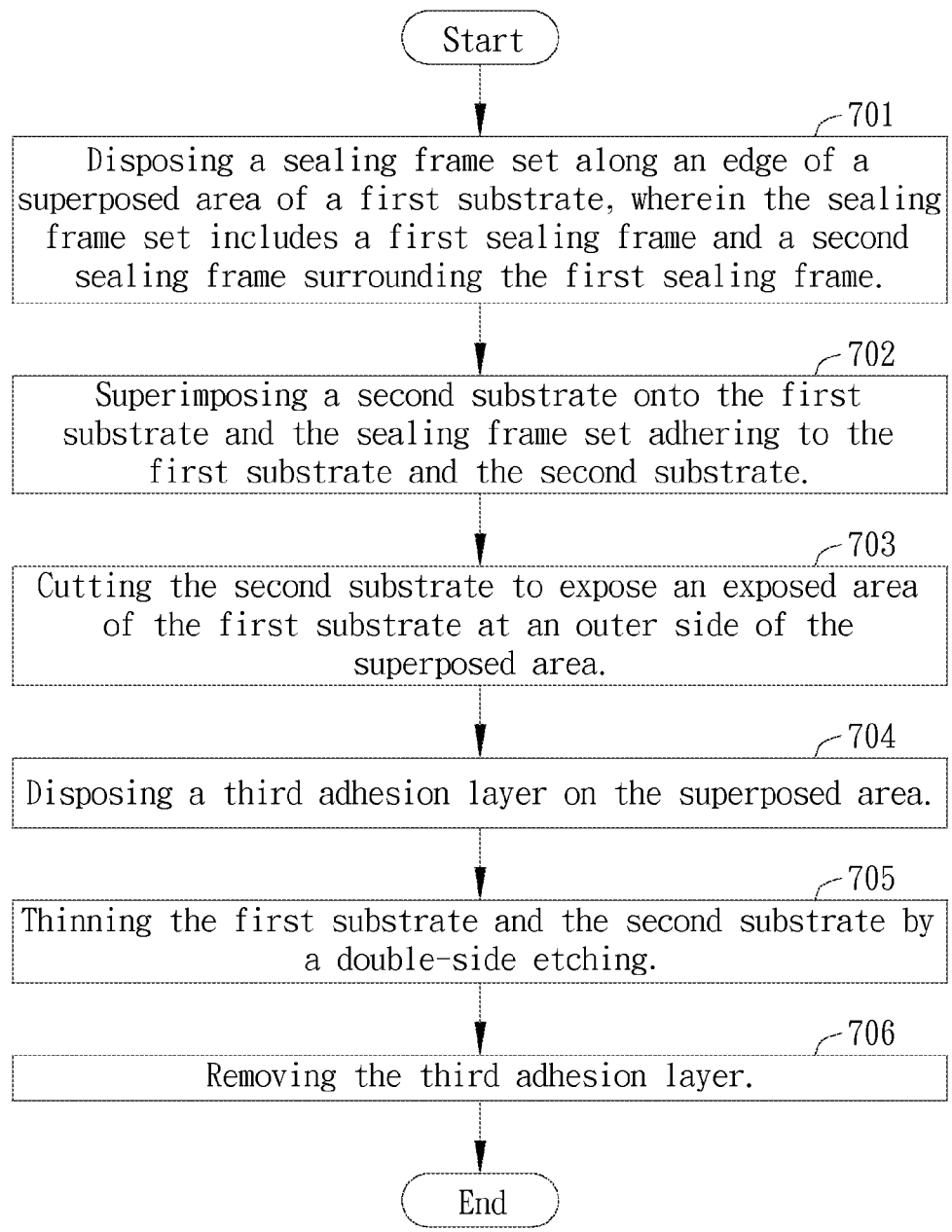
FIG. 7 is a flow chart of a manufacturing method of the display panel of the present invention.

FIG. 6A-FIG. 6B and FIG. 7 demonstrate a manufacturing method of the display panel of the present invention, wherein the display panel 10 and the manufacturing method thereof is taken for example. As FIG. 6A-FIG. 6B show, the manufacturing method of the display panel includes step 701: disposing a sealing frame set 300 along an edge of a superposed area 152 of a first substrate 100, wherein the sealing frame set 300 includes a first sealing frame 310 and a second sealing frame 320 surrounding the first sealing frame 310.

Further taking a manufacture of the liquid crystal panel for example, the step 701 may include providing a first parent substrate (or namely first mother substrate) 100'. The first parent substrate 100' includes a plurality of first substrates 100 which may have TFT arrays disposed or formed thereon after the production of the first parent substrate 100'. Each of the first substrates 100 has the superposed area 152, the array 155 disposed on the superposed area 152, and an exposed area. The sealing frame set 300 is disposed within the superposed area 152 close to the edge thereof as shown in FIG. 6A above. The superposed area 152 of each first substrate 100 is next infused respectively with liquid crystals.

The manufacturing method of the display panel includes step 702: superposing a second substrate 200 onto the first substrate 100 and the sealing frame set 300 adhering to the first substrate 100 and the second substrate 200.

Again, taking the manufacture of the liquid crystal display panel for example. After disposing the sealing frame set 300 along the edge of the superposed area 152, in the step 702 a second parent substrate (or namely second mother substrate) 200' is further provided and superposed onto the first parent substrate 100'. The second parent substrate 200' includes a plurality of second substrates 200 which may have color filters disposed or formed thereon to constitute the pixel structure of the second substrate 200. The second substrate 200 arranged in the second parent substrate 200' corresponds to the first substrate 100 arranged in the first parent substrate 100'. Furthermore, when the first parent substrate 100' and the second parent substrate 200' are superposed, the plurality of first substrates 100 respectively corresponds to the plurality of second substrates 200. The sealing frame set 300 of each first substrate 100 adheres the first substrate 100 and the corresponding second substrate 200 and accordingly connects the first parent substrate 100' and the second parent substrate 200'.

The manufacturing method of the display panel includes step 703: cutting the second substrate 200 to expose an exposed area 154 of the first substrate 100 at an outer side of the superposed area 152.

Take the manufacture of the liquid crystal display panel for example. As above-mentioned, the first parent substrate 100' and the second parent substrate 200' are superposed and the sealing frame set 300 connects the first substrate 100 and its corresponding second substrate 200 and adheres the first parent substrate 100' and the second parent substrate 200'; afterwards the superposed first parent substrate 100' and second parent substrate 200' are cut in the step 703. The second substrate 200 is further cut so as to expose the exposed area 154 of the first substrate 100. For example, as shown in FIG. 6A, the superposed first parent substrate 100' and second parent substrate 200' are cut in accordance with a cutting line Cu2 which results in separation of the plurality of first substrates 100 and the plurality of second substrates 200, wherein the first substrate 100 and its corresponding second substrate 200 are connected by means of the sealing frame set 300 in the superposed area 152 and along the edge thereof. The second substrate 200 are next cut in accordance with a cutting line Cu1 in order to remove a portion of the second substrate 200 above the exposed area 154 and expose the exposed area 154 of the first substrate 100. One or more cutting lines Cu1 may be predetermined in accordance with varied embodiments such as embodiments in which the exposed area 154 is located on one side of the superposed area 152 or two adjacent sides of the same. The finished product of the cutting step is shown in the bottom of FIG. 6A.

The manufacturing method of the display panel includes step 704: disposing a third adhesion layer 450 on the exposed area 154 of the first substrate 100, as shown in FIG. 6B. Further speaking, the third adhesion layer 450 which is disposed on the exposed area 154 preferably shields or covers the bonding area; accordingly, the bonding area is protected by the third adhesion layer 450. For example, the third adhesion layer 450 may protect the bonding area after the step 704 from contacting the etching agent in a thinning process such as an etching step. Disposing the third adhesion layer 450 may include applying the adhesion component of the third adhesion layer 450 to the exposed area 154 of the first substrate 100 and curing the same with UV light or solidifying the same with heat (e.g. baking) to complete the disposition of the third adhesion layer 450. As mentioned above, the adhesion component of the third adhesion layer 450 preferably has very low silicon content and is attached to the exposed area 154 and removable. In addition, the third adhesion layer 450 may slightly extend outside the exposed area 154 and between the first substrate 100 and the second substrate 200; meanwhile, the third adhesion layer 450 is next to the second sealing frame 320.

The manufacturing method of the display panel includes step 705: thinning the first substrate and the second substrate by a double-side etching. As the embodiment shown in the middle of FIG. 6B, the display panel 10 preferably has its first substrate 100 and second substrate 200 thinned by means of etching. The first substrate and the second substrate after the thinning process may have the thickness of such as about 0.1 mm. For example, the etching agent Et may be such as hydrofluoric acid solution. When the display panel 10 is immersed in the etching agent Et, exposed portions of the first substrate and the second substrate will be etched, i.e. double-side etching. Theoretically the first and the second substrates are etched at the same rate; finally the thickness of the first substrate and the thickness of the second substrate are substantially the same. The thickness may depend upon the etching agent (Et) concentration and the etching period.

On the other hand, because of the disposing of the sealing frame set 300 and the third adhesion layer 450, the space between the first substrate 100 and the second substrate 200 that is surrounded and enclosed by the sealing frame set 300 as well as the bonding area is prevented from contacting the etching agent Et. Therefore, the array and the pixel structure disposed in the space are also protected from contacting the etching agent Et. The second sealing frame 320 of the sealing frame set 300 protects the first sealing frame 310 which contains the silicon-containing compound. In addition, shapes of an edge of the first substrate 100 or an edge of the second substrate 200 may be controlled by adjusting the etching period, the etching agent concentration, or the location of the first sealing frame 310.

The manufacturing method of the display panel includes step 706: removing the third adhesion layer 450. The ways of removing the third adhesion layer 450 may include peeling, tearing, pulling off or chemical reaction such as the use of alkaline solution so that the bonding area previously covered by the third adhesion layer 450 is exposed for wiring.

In the present invention, some residual of the adhesion component between the first substrate and the second substrate after the step 706 is not avoidable, wherein the residual of the adhesion component forms the third adhesion portion 400. On the other hand, the third adhesion portion 400 may further extend to the exposed area 154. However, compared to a portion of the third adhesion portion 400 existed between the first substrate and the second substrate, the adhesion component of a portion of the third adhesion portion 400 in the exposed area 154 is in a form of polymer residual which can be identified by such as Energy Dispersive X-Ray (EDX) analysis. In one embodiment of the present invention, an area where the third adhesion layer 450 is originally disposed such as the exposed area 154 after the treatment in the steps 704 and 706 and the exposed area 154 without the treatments of steps 704 and 706 are compared by means of EDX. It is discovered that the polymer residual resulted from the former results in higher carbon content, such as 2% higher in the area where the third adhesion layer 450 is originally disposed.

Figure 8A:
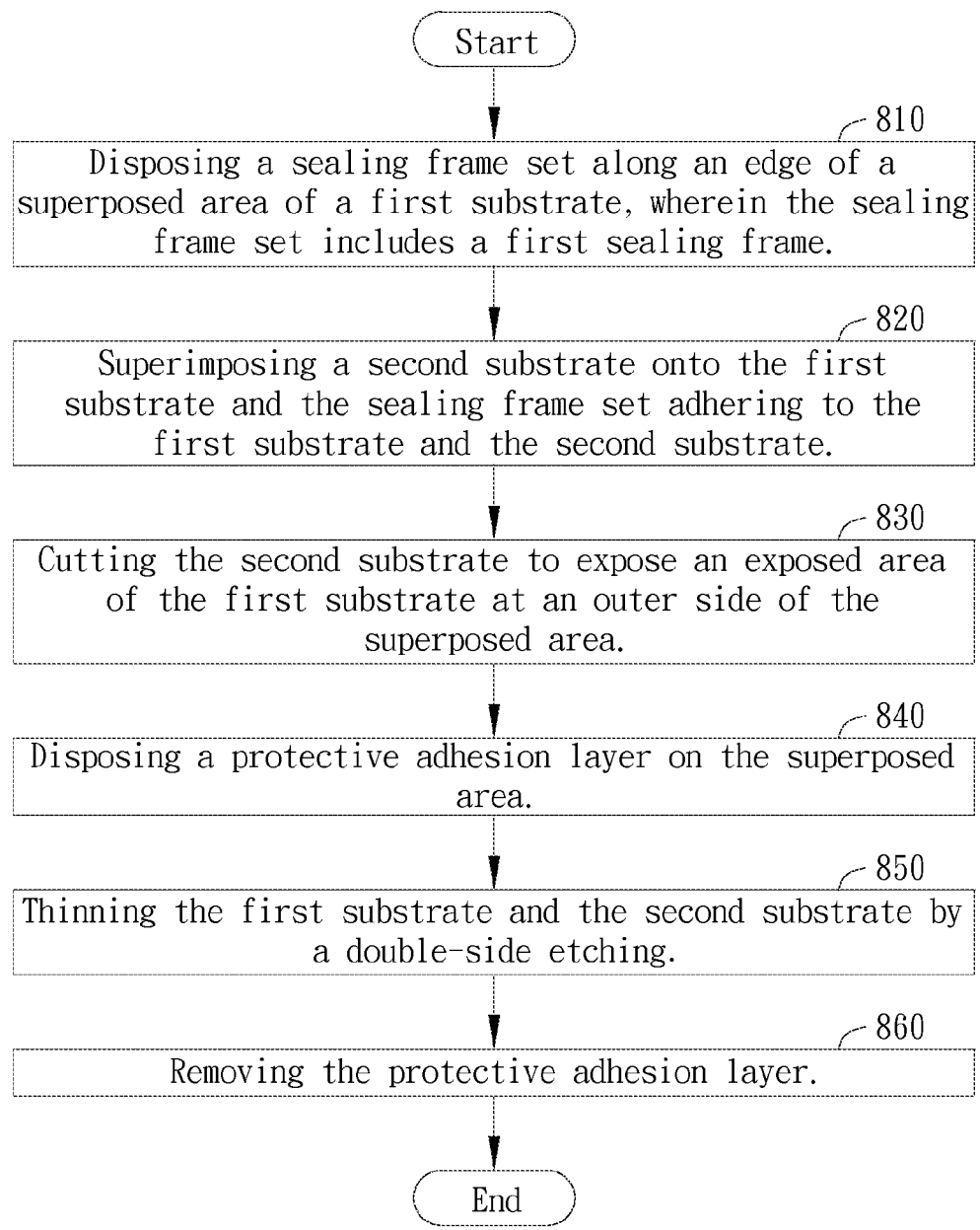
FIG. 8A is another flow chart of the manufacturing method of the display panel of the present invention.
Figure 8B:
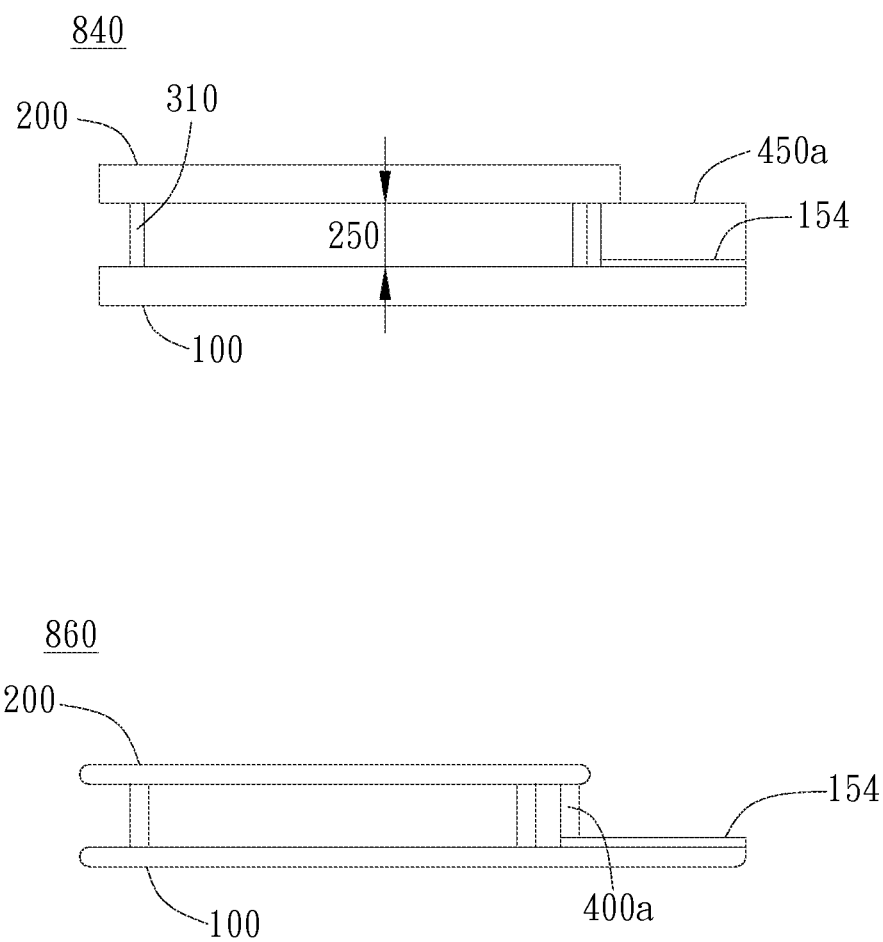
FIG. 8B shows cross-sectional views of the display panel of the present invention after the steps 840 and 860 shown in FIG. 8A.

FIG. 8A is a flow chart of the manufacturing method of the embodiment of the display panel shown in FIG. 4A and FIG. 4B; FIG. 8B shows cross-sectional views of the embodiment of the display panel after the steps 840 and 860. Differences from the above mentioned manufacturing method are described here and please refer to FIG. 6A, FIG. 6B and FIG. 7 as well as the related descriptions for the same steps in the manufacturing methods; details are not repeated. The manufacturing method of the display panel includes step 810: disposing a sealing frame set 300 along an edge of a superposed area 152 of a first substrate 100, wherein the sealing frame set 300 includes a first sealing frame 310. Take a manufacture of a liquid crystal panel for example; the step 810 may include providing the first parent substrate 100'. The first parent substrate 100' includes a plurality of first substrates 100 which may have TFT arrays disposed or formed thereon after the production thereof. Each first substrate 100 has the superposed area 152, the array 155 disposed on the superposed area 152, and the exposed area 154. Disposing of the sealing frame set 300 includes disposing the first sealing frame 310 in the superposed area 152 close to the edge thereof.

The manufacturing method of the display panel includes step 840: disposing a protective adhesion layer 450a on the exposed area 154. The disposing of the protective adhesion layer 450a may include applying the adhesion component of the protective adhesion layer 450a to the exposed area 154 of the first substrate 100 and curing the same with UV light or solidifying the same with heat (e.g. baking) to complete the disposition of the third adhesion layer 450. In addition, the step 840 further includes enabling the protective adhesion layer 450a to slightly extend outside the exposed area 154 and between the first substrate 100 and the second substrate 200.

The manufacturing method of the display panel includes step 860: removing the protective adhesion layer 450a. Some residual of the adhesion component on the first substrate after the step 860 of removing the protective adhesion layer 450a is not avoidable. In addition, the step 860 further includes having the protective adhesion portion 400a remained between the first sealing frame 310 and the exposed area 154.

Figure 9A:
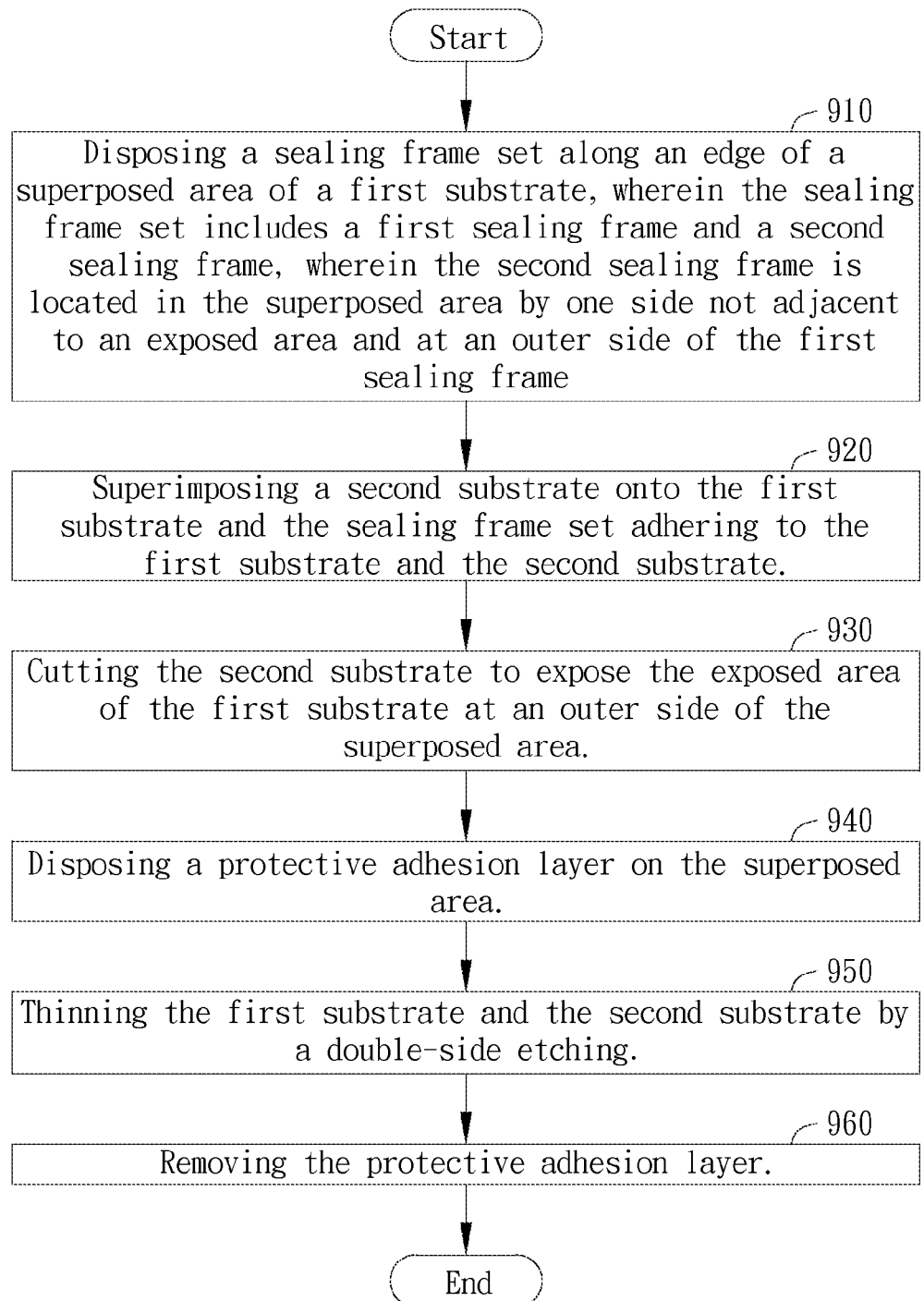
FIG. 9A is another flow chart of the manufacturing method of the display panel of the present invention.
Figure 9B:
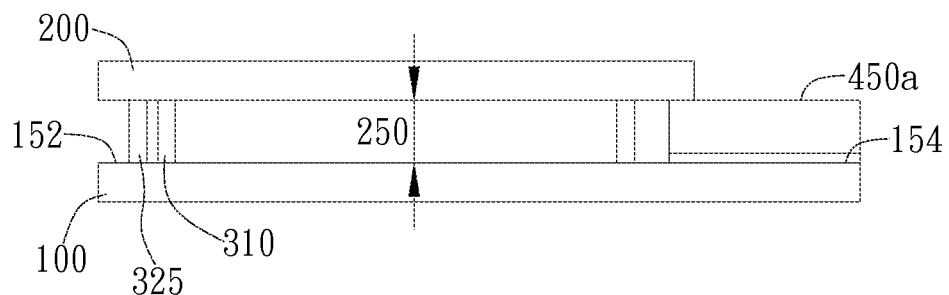
FIG. 9B shows cross-sectional views of the display panel of the present invention after the steps 940 and 960 shown in FIG. 9A.
Figure 9B:
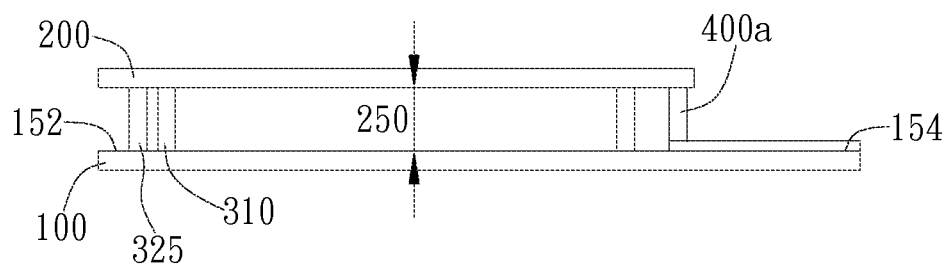

FIG. 9A is a flow chart of the manufacturing method of the embodiment of the display panel shown in FIG. 5A and FIG. 5B; FIG. 9B shows cross-sectional views of the embodiment of the display panel after the steps 940 and 960. Differences from the above mentioned manufacturing method are described here and please refer to FIG. 6A, FIG. 6B and FIG. 7 as well as the related descriptions for the same steps in the manufacturing methods; details are not repeated. The manufacturing method of the display panel includes step 910: disposing a sealing frame set 300 along an edge of a superposed area 152 of a first substrate 100, wherein the sealing frame set 300 includes a first sealing frame 310 and a second sealing frame 320, wherein the second sealing frame 320 is located outsides the first sealing frame 310 and on the side of the superposed area 152 that is not adjacent to the exposed area 154. Take the manufacture of the liquid crystal display panel for example. The step 910 may include providing the first parent substrate 100'. The first parent substrate 100' includes a plurality of first substrates 100 which may have TFT arrays disposed or formed thereon after the production thereof. Each the first substrate 100 has the superposed area 152, the array 155 disposed on the superposed area 152, and the exposed area 154. Disposing of the sealing frame set 300 includes disposing the first sealing frame 310 in the superposed area 152 close to the edge and disposing the second sealing frame 320 outsides the first sealing frame 310 and on the side of the superposed area 152 not adjacent to the exposed area 154. The first sealing frame 310 and the second sealing frame 320 may adhere the first substrate 100 and the corresponding second substrate 200 as well as adhering the first parent substrate 100' and the second parent substrate 200'.

The manufacturing method of the display panel includes step 940: disposing a protective adhesion layer 450a on the exposed area 154. The disposing of the protective adhesion layer 450a may include applying the adhesion component of the protective adhesion layer 450a to the exposed area 154 of the first substrate 100 and curing the same with UV light or solidifying the same with heat (e.g. baking) to complete the disposition of the protective adhesion layer 450a. In addition, the step 940 further includes enabling the protective adhesion layer 450a to slightly extend outside the exposed area 154 and between the first substrate 100 and the second substrate 200.

The manufacturing method of the display panel includes step 960: removing the protective adhesion layer 450a. Some residual of the adhesion component on the first substrate after the step 960 of removing the protective adhesion layer 450a is not avoidable. In addition, the step 960 further includes having the protective adhesion portion 400a remained between the first sealing frame 310 and the exposed area 154.

In sum, in the preferred embodiments of the present invention, the thinning step of the substrate(s) are performed after the cutting step of the superposed first and second parent substrates and the cutting step of the second substrate which exposes the exposed area of the first substrate. In comparison to the process in which the thinning step is performed before the cutting step of the second substrate, the substrate(s) to be cut in the preferred embodiment of the present invention is thicker and the substrate is less likely cracked due to the weak rigidity. The cutting efficiency is therefore improved and the substrate(s) have sturdy edge(s). Furthermore, since the second sealing frame having anti-etching capacity is disposed in advance between the first and second parent substrates as well as enclosing the space when assembling the parent substrates, it is unnecessary to apply protective adhesion in advance on the edge of the first and second substrates around the space as done by the prior art and also unnecessary to cut the portions of the first and second substrates connected by the protective adhesion after the etching/thinning process. Accordingly, the substrate is prevented from cracking in the cutting process due to a small thickness.

Because of the smaller thickness, the display panel of the present invention or the display panels made by the manufacturing method of the present invention may be processed to form curved display panel(s).

Although the preferred embodiments of present disclosure have been described herein, the above description is merely illustrative. The preferred embodiments disclosed will not limited the scope of the present disclosure. Further modification of the disclosure herein disclosed will occur to those skilled in the respective arts and all such modifications are deemed to be within the scope of the disclosure as defined by the appended claims.

What is claimed is:
1. A display panel, including:
   a first substrate having an inner surface, wherein the inner surface includes a superposed area and an exposed area on at least one side of the superposed area;
   a second substrate disposed and superposed on the superposed area, the second substrate and the first substrate having a space therebetween;
   a sealing frame set located between the first substrate and the second substrate and disposed along and insides an edge of the superposed area to enclose the space, wherein the sealing frame set includes:
   a first sealing frame connecting the first substrate and the second substrate and surrounding the superposed area; and
   a second sealing frame surrounding an outer side of the first sealing frame; and
   a third adhesion portion located between the first substrate and the second substrate and located between the second sealing frame and the exposed area.

2. The display panel of claim 1, wherein the third adhesion portion contains polymer residual.

3. The display panel of claim 1, wherein the first sealing frame contains a plurality of spacers, the second sealing frame contains no spacer.

4. The display panel of claim 3, wherein the first sealing frames contains silicon, the second sealing frames contains no silicon.

5. The display panel of claim 1, wherein strength of the first sealing frame adhering to the first substrate and the second substrate is greater than strength of the second sealing frame adhering to the first substrate and the second substrate.

6. The display panel of claim 1, wherein strength of the third adhesion portion adhering to the first substrate or the second substrate is smaller than strength of the first sealing frame or the second sealing frame adhering to the first substrate and the second substrate.

7. A manufacturing method of a display panel, including:
   (a) disposing a sealing frame set along an edge of a superposed area of a first substrate, wherein the sealing frame set includes a first sealing frame and a second sealing frame surrounding the first sealing frame;
   (b) superposing a second substrate onto the first substrate and the sealing frame set adhering to the first substrate and the second substrate;

(c) cutting the second substrate to expose an exposed area of the first substrate at an outer side of the superposed area;
(d) disposing a third adhesion layer on the superposed area;
(e) thinning the first substrate and the second substrate by a double-side etching; and
(f) removing the third adhesion layer.

8. The method of claim 7, wherein the step (b) includes extending the third adhesion layer between the first substrate and the second substrate; the step (f) includes remaining a third adhesion portion between the second sealing frame and the exposed area when removing the third adhesion layer.

9. A display panel, including:
a first substrate having an inner surface, wherein the inner surface includes a superposed area and an exposed area on at least one side of the superposed area;
a second substrate disposed and superposed on the superposed area, the second substrate and the first substrate having a space therebetween;
a sealing frame set located between the first substrate and the second substrate, including:
a first sealing frame connecting the first substrate and the second substrate, the first sealing frame disposed along and insides an edge of the superposed area and surrounding the superposed area to enclose the space; and
a protective adhesive portion located between the first substrate and the second substrate, and located between the first sealing frame and the exposed area;
wherein the sealing frame set further includes a second sealing frame located in the superposed area at one side not adjacent to the exposed area and at an outer side of the first sealing frame.

10. The display panel of claim 9, wherein the protective adhesive portion contains polymer residual.

11. The display panel of claim 9, wherein the first sealing frame contains a plurality of spacers.

12. The display panel of claim 11, wherein the first sealing frame contains silicon.

13. The display panel of claim 9, wherein the first sealing frame contains silicon, the content of silicon in the first sealing frame is greater than content of silicon in the second sealing frame.

14. The display panel of claim 9, wherein strength of the first sealing frame adhering to the first substrate and the second substrate is greater than strength of the second sealing frame adhering to the first substrate and the second substrate.

15. The display panel of claim 9, wherein strength of the protective adhesive portion adhering to the first substrate or the second substrate is smaller than strength of the first sealing frame or the second sealing frame adhering to the first substrate and the second substrate.

16. A manufacturing method of display panel, including:
(a) disposing a sealing frame set along an edge of a superposed area of a first substrate, wherein the sealing frame includes a first sealing frame;
(b) superposing a second substrate onto the first substrate and the sealing frame set adhering to the first substrate and the second substrate;
(c) cutting the second substrate to expose an exposed area of the first substrate at an outer side of the superposed area;
(d) disposing a protective adhesion layer on the exposed area;
(e) thinning the first substrate and the second substrate by a double-side etching; and
(f) removing the protective adhesion layer.

17. The method of claim 16, wherein the step (a) further includes disposing a second sealing frame in the superposed area at one side not adjacent to the exposed area and at an outer side of the first sealing frame.

18. The method of claim 16, wherein the step (d) includes extending the protective adhesion layer between the first substrate and the second substrate; the step (f) includes remaining a protective adhesion portion between the first sealing frame and the exposed area when removing the protective adhesion layer.

* * * * *